(12) United States Patent
Zhu

(10) Patent No.: US 10,840,500 B2
(45) Date of Patent: Nov. 17, 2020

(54) SUPERIONIC CONDUCTIVE POLYMER ELECTROLYTE COMPOSITE FOR LITHIUM BATTERY

(71) Applicant: Yu Zhu, Copley, OH (US)

(72) Inventor: Yu Zhu, Copley, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 16/434,240

(22) Filed: Jun. 7, 2019

(65) Prior Publication Data

US 2019/0379034 A1 Dec. 12, 2019

Related U.S. Application Data

(60) Provisional application No. 62/681,833, filed on Jun. 7, 2019.

(51) Int. Cl.
| | | |
|---|---|---|
| *H01M 4/131* | (2010.01) | |
| *H01M 4/136* | (2010.01) | |
| *H01M 4/1391* | (2010.01) | |
| *H01M 4/1397* | (2010.01) | |
| *H01M 10/0525* | (2010.01) | |
| *H01M 10/0565* | (2010.01) | |
| *H01M 4/02* | (2006.01) | |

(52) U.S. Cl.
CPC ........... *H01M 4/131* (2013.01); *H01M 4/136* (2013.01); *H01M 4/1391* (2013.01); *H01M 4/1397* (2013.01); *H01M 10/0525* (2013.01); *H01M 10/0565* (2013.01); *H01M 2004/028* (2013.01); *H01M 2300/0082* (2013.01); *H01M 2300/0091* (2013.01)

(58) Field of Classification Search
CPC .... H01M 4/131; H01M 4/136; H01M 4/1391; H01M 4/1397; H01M 10/0525; H01M 10/0565
See application file for complete search history.

(56) References Cited

U.S. PATENT DOCUMENTS

| | | | |
|---|---|---|---|
| 6,368,746 B1 | 4/2002 | Takada et al. | |
| 7,081,142 B1* | 7/2006 | Carlson | H01M 2/1673 29/623.5 |
| 9,548,514 B2 | 1/2017 | Kyu et al. | |
| 2001/0023041 A1* | 9/2001 | Hayase | H01M 10/052 429/303 |
| 2003/0059681 A1 | 3/2003 | Noh | |
| 2005/0026041 A1* | 2/2005 | Jouanneau | H01M 4/40 429/231.2 |
| 2005/0196678 A1 | 9/2005 | Yamamoto et al. | |

OTHER PUBLICATIONS

R. He et al, Chemical and electrochemical stability enhancement of lithium bis (oxalato)borate (LiBOB)-modified solid polymer electrolyte membrane in lithium ion half-cells, Electrochimica Acta 246 (2017) 123-134.

* cited by examiner

*Primary Examiner* — Stewart A Fraser
(74) *Attorney, Agent, or Firm* — Renner Kenner Greive Bobak Taylor & Weber

(57) ABSTRACT

A method of creating a composite cathode for use within a lithium ion battery. The method beginning with the step of preparing an electrolytic solution. The electrolytic solution includes a plasticizer, a crosslinkable polyether, a first lithium salt and a second lithium salt. The method ending with the step of impregnating a cathodic material with the electrolytic solution so as to form the composite cathode.

20 Claims, 1 Drawing Sheet

SUPERIONIC CONDUCTIVE POLYMER ELECTROLYTE COMPOSITE FOR LITHIUM BATTERY

CROSS-REFERENCE TO RELATED FILINGS

The present application claims the benefit of U.S. Provisional Patent Application No. 62/681,833 filed Jun. 7, 2018 entitled "Supertonic Conductive Polymer Electrolyte Composite for Lithium Battery".

FIELD OF THE INVENTION

The present invention generally relates to the preparation of composite cathodes for use within lithium ion batteries. More particularly, the present invention relates to the use of a precursor polymer electrolytic solution to infiltrate a casted cathodic material so as to create a composite cathode for use within a lithium ion battery. In particular embodiments, the present invention relates to the use of a double lithium salt-based electrolytic solution to create a composite cathode for use within a lithium ion battery having better stability at a higher voltage.

BACKGROUND OF THE INVENTION

Lithium ion batteries have become a technological advancement that is inseparable from our daily lives. They offer valuable features such as long cycle stability, high power, and energy density that further extend the usage time for portable electronics and electric vehicles, amongst many devices. The development of solid electrolytes for polymer lithium batteries has been a major challenge in the energy storage industry. With current lithium ion battery technology, organic solvents are customarily used as a means of ionizing the ionic lithium salt while concurrently promoting ion transport through polymeric membranes. However, the interaction between the solvents and the electrodes leads to contamination, which in turn reduces the battery shelf life. Additionally, the organic solvents are contained in metal containers of various shapes, making most lithium batteries heavy and bulky such that significant space is required for intended applications, for instance, in electric vehicles. Moreover, damaged or leaky battery containers can present a safety risk.

As a result, several major efforts have been directed to the fabrication of non-volatile conductive membranes, notably polymer gel based electrolytes. The conventional polymer electrolyte utilizes poly(ethylene oxide) (PEO) as a matrix, but the room temperature ionic conductivity was orders of magnitude lower than the conventional lithium battery containing organic solvents. Recently, researchers demonstrated the feasibility of producing solvent-free solid electrolytes by doping with succinonitrile (SCN) plastic crystals for lithium ion transport. They showed that only a small amount of lithium salt (1 mol %) was needed to achieve reasonably high ionic conductivity—on the order of $10^{-4}$ S cm$^{-1}$—despite the fact that SCN itself is a poor ionic conductor. However, the plastic crystal matrix is a waxy substance without sustainable mechanical integrity thereby preventing its full utilization as a solid electrolyte.

Others have attempted to create solvent-free polymeric electrolyte membranes by combining PEO with photo-curable poly(ethylene glycol) dimethacrylate (PEGDMA) (to afford mechanical strength) and SCN (for lithium ion transport). Recently, a respectable room temperature ionic conductivity on the order of $10^{-4}$ S cm$^{-1}$ was achieved with the aid of SCN plastic crystal matrix, the conductivity approaching the level of $10^{-3}$ S cm$^{-1}$ at elevated temperatures higher than 80° C. Although promising, this polymeric electrolyte has to rely on the plastic crystal phase of SCN in the PEO/PEGDMA matrix to achieve both sufficiently high ionic conductivity and mechanical strength.

Therefore, there is a need for a polymeric electrolytic solution that exhibits excellent electrochemical stability during long cycle testing and a need for a means of introducing the electrolytic solution into a lithium ion battery so as not to exhibit any of the negative side effects of previous attempts.

SUMMARY OF THE INVENTION

A first embodiment of this invention provides a method of creating a composite cathode for use within a lithium ion battery comprising the steps of: preparing an electrolytic solution wherein the electrolytic solution includes a plasticizer, a crosslinkable polyether, a first lithium salt and a second lithium salt; and impregnating a cathodic material in the electrolytic solution so as to form the composite cathode.

A second embodiment provides a method as in the first embodiment, wherein the cathodic material is selected from the group consisting of consisting of Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), and Lithium Manganese Oxide (LMO).

A third embodiment provides a method as in either the first embodiment or the second embodiment, wherein the plasticizer is selected from the group consisting of glutaronitrile (GCN), succinonitrile (SCN), adiponitrile, camphor, dialkylsebacate, alkyl sterate, and mixtures thereof.

A fourth embodiment provides a method as in any of the first through third embodiments, wherein the crosslinkable polyether is selected from the group consisting of poly(ethylene glycol)diacrylate (PEGDA), poly(ethylene glycol) dimethacrylate (PEGDMA), polypropylene glycol) diacrylate (PPGDA), and polypropylene glycol) dimethacrylate (PPGDMA), fluoralkyl diacrylate, fluoroalkyl monoacrylate, fluoroalkyl dimetharylate, fluoralkyl metharylate, and mixtures thereof.

A fifth embodiment provides a method as in any of the first through fourth embodiments, wherein the first lithium salt is selected from the group consisting of lithium bis-trifluoromethanesulfonylimide (LiTFSI), lithium bis-perfluoroethylsulfonylimide, lithium tetrafluoroborate, and lithium perchlorate and mixtures thereof.

A sixth embodiment provides a method as in any of the first through fifth embodiments, wherein the second lithium salt is selected from the group consisting of lithium bis (oxalate)borate (LiBOB), lithium tetrafluoroborate (LiBF$_4$), lithium difluoro(oxalate)borate (LiODFB), lithium hexfluorophosphate LiPF$_6$), and mixtures thereof.

A seventh embodiment provides a method as in any of the first through sixth embodiments, wherein the plasticizer is GCN, the crosslinkable polyether is PEGDA, the first lithium salt is LiTFSI, and the second lithium salt is LiBOB.

A eighth embodiment provides a method of creating a lithium ion battery comprising the steps of: preparing an anode; preparing a composite cathode comprising the steps of: preparing an electrolytic solution wherein the electrolytic solution includes a plasticizer, a crosslinkable polyether, a first lithium salt and a second lithium salt; and impregnating a cathodic material with the electrolytic solution so as to form the composite cathode; and combining the anode and composite cathode to create the lithium ion battery.

A ninth embodiment provides a method as in the eighth embodiment, wherein the anode is selected from the group consisting of lithium metal, graphite, silicon, tin germanium, and combination thereof.

A tenth embodiment provides a method as in any of the eighth or ninth embodiments, wherein the cathodic material is selected from the group consisting of consisting of Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), and Lithium Manganese Oxide (LMO).

An eleventh embodiment provides a method as in any of the eighth through tenth embodiments, wherein the plasticizer is selected from the group consisting of glutaronitrile (GCN), succinonitrile (SCN), adiponitrile, camphor, dialkylsebacate, alkyl sterate, and mixtures thereof.

A twelfth embodiment provides a method as in any of the eighth through eleventh embodiments, wherein the crosslinkable polyether is selected from the group consisting of poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA), fluoralkyl diacrylate, fluoroalkyl monoacrylate, fluoroalkyl dimetharylate, fluoroalkyl metharylate, and mixtures thereof.

A thirteenth embodiment provides a method as in any of the eighth through twelfth embodiments, wherein the first lithium salt is selected from the group consisting of lithium bis-trifluoromethanesulfonylimide (LiTFSI), lithium bis-perfluoroethylsulfonylimide, lithium tetrafluoroborate, and lithium perchlorate and mixtures thereof.

A fourteenth embodiment provides a method as in any of the eighth through thirteenth embodiments, wherein the second lithium salt is selected from the group consisting of lithium bis(oxalate)borate (LiBOB), lithium tetrafluoroborate (LiBF$_4$), lithium difluoro(oxalate)borate (LiODFB), lithium hexfluorophosphate LiPF$_6$), and mixtures thereof.

A fifteenth embodiment provides a method as in any of the eighth through fourteenth embodiments, wherein the plasticizer is GCN, the crosslinkable polyether is PEGDA, the first lithium salt is LiTFSI, and the second lithium salt is LiBOB.

A sixteenth embodiment provides a method as in any of the eighth through fifteenth embodiments, further comprising the step of preparing a solid polymer electrolytic film prior to the combining step.

A seventeenth embodiment provides a method as in any of the eighth through sixteenth embodiments, wherein the step of preparing a solid polymer electrolytic film comprises the sub-steps of: preparing an electrolytic film solution wherein the electrolytic film solution includes a plasticizer, a crosslinkable polyether, a first lithium salt, a second lithium salt, and a crosslinking agent; and crosslinking the electrolytic solution to form the solid polymer electrolytic film.

A eighteenth embodiment provides a method as in any of the eighth through seventeenth embodiments, wherein the composite cathode is laminated with the solid polymer electrolytic film to form a laminated cathode.

A nineteenth embodiment provides a method as in any of the eighth through eighteenth embodiments, wherein the plasticizer for the electrolytic film solution is selected from the group consisting of glutaronitrile (GCN), succinonitrile (SCN), adiponitrile, camphor, dialkylsebacate, alkyl sterate, and mixtures thereof.

A twentieth embodiment provides a method as in any of the eighth through nineteenth embodiments, wherein the crosslinkable polyether for the electrolytic film solution is selected from the group consisting of poly(ethylene glycol) diacrylate (PEGDA), poly(ethylene glycol)dimethacrylate (PEGDMA), poly(propylene glycol) diacrylate (PPGDA), and poly(propylene glycol) dimethacrylate (PPGDMA), fluoralkyl diacrylate, fluoroalkyl monoacrylate, fluoroalkyl dimetharylate, fluoroalkyl metharylate, and mixtures thereof.

A twenty-first embodiment provides a method as in any of the eighth through twentieth embodiments, wherein the first lithium salt for the electrolytic film solution is selected from the group consisting of lithium bis-trifluoromethanesulfonylimide (LiTFSI), lithium bis-perfluoroethylsulfonylimide, lithium tetrafluoroborate, and lithium perchlorate and mixtures thereof.

A twenty-second embodiment of this invention provides a method as in any of the eighth through twenty-first embodiments, wherein the second lithium salt for the electrolytic film solution is selected from the group consisting of lithium bis(oxalate)borate (LiBOB), lithium tetrafluoroborate (LiBF$_4$), lithium difluoro(oxalate)borate (LiODFB), lithium hexfluorophosphate LiPF$_6$), and mixtures thereof.

A twenty-third embodiment provides a method as in any of the eighth through twenty-second embodiments, wherein the crosslinking agent for the electrolytic film solution is selected from the group consisting of trimethylolpropane triacrylate (TMPTA), pentaerythritol triacrylate, trimethylolpropane ethoxylate triacrylate, trimethylolpropane propoxylate triacrylate, glycidyl methacrylate (GMA), and mixtures thereof.

A twenty-fourth embodiment provides a method as in any of the eighth through twenty-third embodiments, wherein the electrolytic film solution includes GCN as the plasticizer, PEGDA as the crosslinkable polyether, LiTFSI as the first lithium salt, LiBOB as the second lithium salt, and TMPTA as the crosslinking agent.

DETAILED DESCRIPTION OF ILLUSTRATIVE EMBODIMENTS

Figure 1:
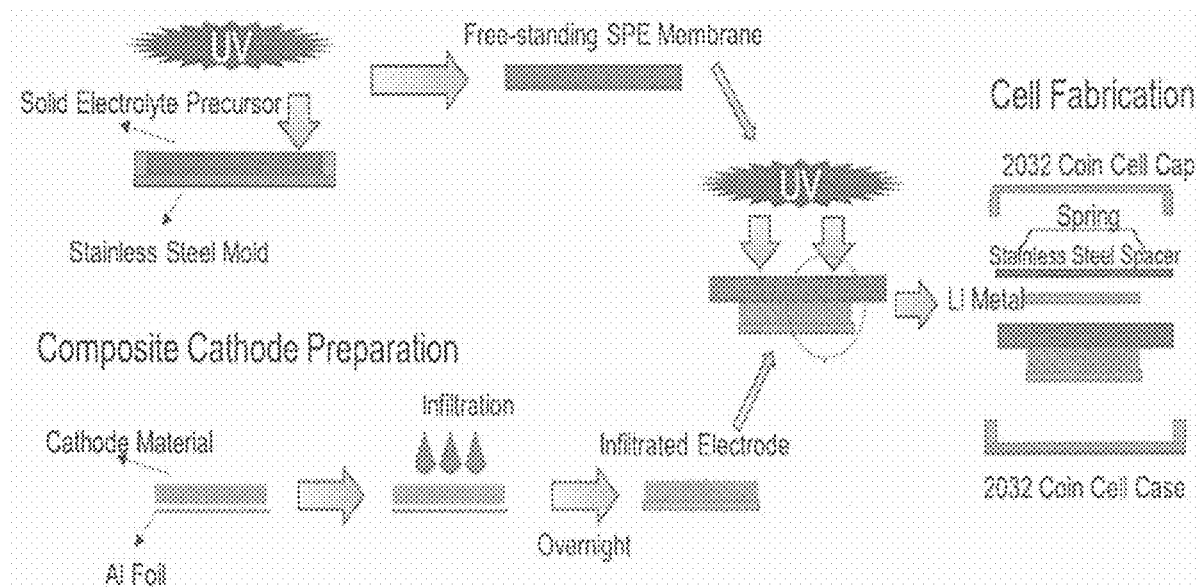
FIG. 1 is a scheme showing the fabrication of a composite cathode to be used to fabricate a lithium ion battery, the scheme also showing the optional step of laminating the composite cathode with a solid polymer electrolytic film.

The present invention provides a method of creating a composite cathode for use within a lithium ion battery and a method of creating a lithium ion battery.

Composite Cathode Creation

The method of creating a composite cathode utilizes a cathodic material impregnated with an electrolytic solution. The electrolytic solution utilizes a plasticizer, a crosslinkable polyether, a first lithium salt and a second lithium salt. Notable, not only is the electrolytic solution isotropic upon initial mixing, it remains isotropic and is completely amorphous. This is achieved by judicious selection of the amount of each component employed. In one embodiment, a composite cathode is created for use within a lithium battery by first preparing an electrolytic solution that includes a plasticizer, a crosslinkable polyether, a first lithium salt and a second lithium salt. Once the electrolytic solution is prepared, a cathodic material is selected and then impregnated with the electrolytic solution.

In some embodiments, the cathodic material is impregnated with the electrolytic solution for at most about 24 hours, in other embodiments at most about 20 hours, and in yet other embodiments, at most about 16 hours. In some embodiments, the cathodic material is impregnated with the electrolytic solution for at least about 8 hours, in other embodiment at least about 10 hours, and in yet other embodiments at least about 12 hours. In some embodiments, the cathodic material is impregnated with the electrolytic solution for between about 24 hours and about 8 hours, in other embodiment between about 20 hours and about 10 hours, and in yet other embodiments between about 16 hours and about 12 hours.

In some embodiments, the cathodic material is selected from the group consisting of Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), and Lithium Manganese Oxide (LMO).

In some embodiments, the plasticizer is selected from the group consisting of glutaronitrile (GCN), succinonitrile (SCN), adiponitrile, camphor, dialkylsebacate, alkyl sterate, and mixtures thereof.

In some embodiments, the crosslinkable polyether is selected based upon having crosslinkable end groups. Virtually any crosslinkable polyether that is able to form an isotropic phase with the plasticizer and the first lithium salt, as described below, may be employed. In some embodiments the crosslinkable polyether is selected from the group consisting of poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA), fluoralkyl diacrylate, fluoralkyl monoacrylate, fluoralkyl dimetharylate, fluoralkyl metharylate, and mixtures thereof.

The crosslinkable polyether may further be chosen based upon its molecular weight. In some embodiments, the crosslinkable polyether has a molecular weight of from 200 or more to 12000 or less. In other embodiments, the crosslinkable polyether has a molecular weight of from 400 or more to 8000 or less, in other embodiments, from 700 or more to 6000 or less, and, in yet other embodiments, from 1000 or more to 6000 or less. In some embodiments, the crosslinkable polyether has a molecular weight equal to or greater than 200, in other embodiments, equal to or greater than 400, in other embodiments, equal to or greater than 700, and in yet other embodiments, equal to or greater than 1000, in other embodiments, equal to or greater than 2000, in other embodiments, equal to or greater than 3000. In some embodiments, the crosslinkable polyether has a molecular weight equal to or less than 12000, in other embodiments, equal to or less than 10000, in other embodiments, equal to or less than 8000, and, in yet other embodiments, equal to or less than 6000.

In a particular embodiment, the crosslinkable polyether is PEGDA. In a particular embodiment the PEGDA has a molecular weight of from 250 or more to 6000 or less, in another embodiment, from 700 or more to 6000 or less, and, in yet another embodiment, from 1000 or more to 6000 or less. In some embodiments, the PEGDA has a molecular weight equal to or greater than 250, in other embodiments, equal to or greater than 700, and, in yet other embodiments, equal to or greater than 1000, in other embodiments, equal to or greater than 2000, in other embodiments, equal to or greater than 3000. In some embodiments, the PEGDA has a molecular weight equal to or less than 12000, in other embodiments, equal to or less than 10000, in other embodiments, equal to or less than 8000, and, in yet other embodiments, equal to or less than 6000.

In some embodiments, the first lithium salt is selected from the group consisting of lithium bis-trifluoromethanesulfonylimide (LiTFSI), lithium bis-perfluoroethylsulfonylimide, lithium tetrafluoroborate, lithium perchlorate, and mixtures thereof.

In some embodiments, the second lithium salt is selected from the group consisting of lithium bis(oxalate)borate (LiBOB), lithium tetrafluoroborate ($LiBF_4$), lithium difluoro (oxalate)borate (LiODFB), lithium hexfluorophosphate $LiPF_6$), and mixtures thereof.

In one embodiment, the cathodic material is LFP, the plasticizer is GCN, the crosslinkable polyether is PEGDA, the first lithium salt is LiTFSI, and the second lithium salt is LiBOB.

Lithium Battery Creation

The method of creating a lithium battery includes the steps of preparing an anode, preparing a composite cathode by utilizing a cathodic material impregnated with an electrolytic solution, and combining the anode and the composite cathode to create the battery.

Unlike a liquid electrolyte, contacting the active material, solid electrolyte, and the carbon filler are crucial for creating a solid electrolyte-based lithium ion battery. Although the magnitude and origin of the interfacial resistance for polymer electrolytes remains a controversial issue, the general concept on how to mitigate the interfacial resistance is to increase the deformability of the electrolyte so as to facilitate conformal contact with other components in a similar manner as their liquid analogs. Such a conformal contact with active materials and the carbon filler is particularly important on the cathode side, where the lithium metal oxides usually have low intrinsic conductivity. A free-standing solid electrolyte film could only work well with cathodes that have low active mass loading.

The composite cathode as described above is required to make such a battery. Due to the low molecular weight of a non-crosslinked crosslinkable polyether, the electrolytic solution is a viscous liquid that can be integrated with active materials, such as those that make up a composite cathode. In some embodiments, the infiltrated cathode can then be laminated with a solid polymer electrolytic film and photo-crosslinked, resulting in a robust composite electrode.

In some embodiments, the anode is selected from the group consisting of lithium metal, graphite, silicon, tin germanium, and combination thereof.

In some embodiments, the composite cathode is created by first preparing an electrolytic solution that includes a plasticizer, a crosslinkable polyether, a first lithium salt and a second lithium salt. Once the electrolytic solution is prepared, a cathodic material is selected and then impregnated with the electrolytic solution.

In some embodiments, the cathodic material is impregnated with the electrolytic solution for at most about 24 hours, in other embodiments at most about 20 hours, and in yet other embodiments, at most about 16 hours. In some embodiments, the cathodic material is impregnated with the electrolytic solution for at least about 8 hours, in other embodiment at least about 10 hours, and in yet other embodiments at least about 12 hours. In some embodiments, the cathodic material is impregnated with the electrolytic solution for between about 24 hours and about 8 hours, in other embodiment between about 20 hours and about 10 hours, and in yet other embodiments between about 16 hours and about 12 hours.

In some embodiments, the cathodic material is selected from the group consisting of Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), and Lithium Manganese Oxide (LMO).

In some embodiments, the plasticizer is selected from the group consisting of glutaronitrile (GCN), succinonitrile (SCN), adiponitrile, camphor, dialkylsebacate, alkyl sterate, and mixtures thereof.

In some embodiments, the crosslinkable polyether is selected based upon having crosslinkable end groups. Virtually any crosslinkable polyether that is able to form an isotropic phase with the plasticizer and the lithium salts, as described below, may be employed. In some embodiments the crosslinkable polyether is selected from the group consisting of poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA), fluoralkyl diacrylate, fluoroalkyl monoacrylate, fluoroalkyl dimetharylate, fluoralkyl metharylate, and mixtures thereof.

The crosslinkable polyether may further be chosen based upon its molecular weight. In some embodiments, the crosslinkable polyether has a molecular weight of from 200 or more to 12000 or less. In other embodiments, the crosslinkable polyether has a molecular weight of from 400 or more to 8000 or less, in other embodiments, from 700 or more to 6000 or less, and, in yet other embodiments, from 1000 or more to 6000 or less. In some embodiments, the crosslinkable polyether has a molecular weight equal to or greater than 200, in other embodiments, equal to or greater than 400, in other embodiments, equal to or greater than 700, and in yet other embodiments, equal to or greater than 1000, in other embodiments, equal to or greater than 2000, in other embodiments, equal to or greater than 3000. In some embodiments, the crosslinkable polyether has a molecular weight equal to or less than 12000, in other embodiments, equal to or less than 10000, in other embodiments, equal to or less than 8000, and, in yet other embodiments, equal to or less than 6000.

In a particular embodiment, the crosslinkable polyether is PEGDA. In a particular embodiment the PEGDA has a molecular weight of from 250 or more to 6000 or less, in another embodiment, from 700 or more to 6000 or less, and, in yet another embodiment, from 1000 or more to 6000 or less. In some embodiments, the PEGDA has a molecular weight equal to or greater than 250, in other embodiments, equal to or greater than 700, and, in yet other embodiments, equal to or greater than 1000, in other embodiments, equal to or greater than 2000, in other embodiments, equal to or greater than 3000. In some embodiments, the PEGDA has a molecular weight equal to or less than 12000, in other embodiments, equal to or less than 10000, in other embodiments, equal to or less than 8000, and, in yet other embodiments, equal to or less than 6000.

In some embodiments, the first lithium salt is selected from the group consisting of lithium bis-trifluoromethanesulfonylimide (LiTFSI), lithium bis-perfluoroethylsulfonylimide, lithium tetrafluoroborate, lithium perchlorate, and mixtures thereof.

In some embodiments, the second lithium salt is selected from the group consisting of lithium bis(oxalate)borate (LiBOB), lithium tetrafluoroborate (LiBF$_4$), lithium difluoro(oxalate)borate (LiODFB), lithium hexfluorophosphate LiPF$_6$), and mixtures thereof.

In one embodiment, the anode is a lithium metal, the cathodic material is LFP, the plasticizer is GCN, the crosslinkable polyether is PEGDA, the first lithium salt is LiTFSI, and the second lithium salt is LiBOB.

In some embodiments when creating a lithium ion battery, prior to the step of combining the anode and composite cathode together, the method further comprising the step of preparing a solid polymer electrolytic film.

In some embodiments, the step of preparing a solid polymer electrolytic film includes the sub-steps of preparing an electrolytic film solution wherein the electrolytic film solution includes a plasticizer, a crosslinkable polyether, a first lithium salt, a second lithium salt, and a crosslinking agent; and crosslinking the electrolytic solution to form the solid polymer electrolytic film. Once the solid polymer electrolytic film is formed, the composite cathode is laminated with the solid polymer electrolytic film to form a laminated cathode that is then combined with the anode.

In some embodiments, the plasticizer used to create the solid polymer electrolytic film is selected from the group consisting of glutaronitrile (GCN), succinonitrile (SCN), adiponitrile, camphor, dialkylsebacate, alkyl sterate, and mixtures thereof.

In some embodiments, the crosslinkable polyether is selected based upon having crosslinkable end groups. Virtually any crosslinkable polyether that is able to form an isotropic phase with the plasticizer and the lithium salts, as described below, may be employed. In some embodiments the crosslinkable polyether is selected from the group consisting of poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA), fluoralkyl diacrylate, fluoroalkyl monoacrylate, fluoroalkyl dimetharylate, fluoralkyl metharylate, and mixtures thereof.

In some embodiments, the first lithium salt used to create the solid polymer electrolytic film is selected from the group consisting of lithium bis-trifluoromethanesulfonylimide (LiTFSI), lithium bis-perfluoroethylsulfonylimide, lithium tetrafluoroborate, lithium perchlorate, and mixtures thereof.

In some embodiments, the second lithium salt used to create the solid polymer electrolytic film is selected from the group consisting of lithium bis(oxalate)borate (LiBOB), lithium tetrafluoroborate (LiBF$_4$), lithium difluoro(oxalate)borate (LiODFB), lithium hexfluorophosphate LiPF$_6$), and mixtures thereof.

Because the degree of crosslinking will affect the mechanical properties of the resultant solid polymer electrolytic film, the electrolytic solution will include a small molecule serving as a crosslinking agent to increase the crosslinking density and thus enhance mechanical properties. The crosslinking agent is selected to be multifunctional, meaning each unit of the crosslinking agent will have multiple crosslinking sites. In some embodiments, the crosslinking agent is selected from multifunctional small molecules including trimethylolpropane triacrylate (TMPTA), pentaerythritol triacrylate, trimethylolpropane ethoxylate triacrylate, trimethylolpropane propoxylate triacrylate, glycidyl methacrylate (GMA), and mixtures thereof. The crosslinking agent, as a multifunctional small molecule, will serve as a hub for the extension of the polymer chain, thus increasing crosslinking density.

In one embodiment, when preparing the solid polymer electrolytic film the plasticizer is GCN, the crosslinkable polyether is PEGDA, the first lithium salt is LiTFSI, the second lithium salt is LiBOB, and the crosslinking agent is TMPTA.

The crosslinkable polyether is ultimately crosslinked to form the solid polymer electrolytic film. Thus, in some embodiments, a small amount of initiator will be employed. The initiator is chosen based upon the crosslinkable polyether and its ability to initiate the desired crosslinking. In some embodiments, the crosslinking of the crosslinkable polyether is photoinitiated, and in other embodiments, the crosslinking is thermally initiated. In some embodiments, the crosslinking can be both photoinitiated and thermally initiated.

In some embodiments, the initiator is selected from photoinitiators or thermoinitiators. In some embodiments the initiator is a photoinitiator selected from 2,2-Dimethoxy-1, 2-diphenylethan-1-one (Irgacure 651, Ciba Specialty Chemicals) and bis(2,4,6-trimethylbenzoyl)-phenylphoshineoxide (Irgacure 819, Ciba Specialty Chemicals). In some embodiments, the initiator is a thermal initiators selected from peroxide and peroxide derivatives, Notably, the mixtures used to form the solid polymer electrolytic film herein are devoid of solvents, and the process for fabricating the solid polymer electrolytic films is devoid of solvents. Solvents are not needed to create the solid polymer electrolytic film.

Figure 2:
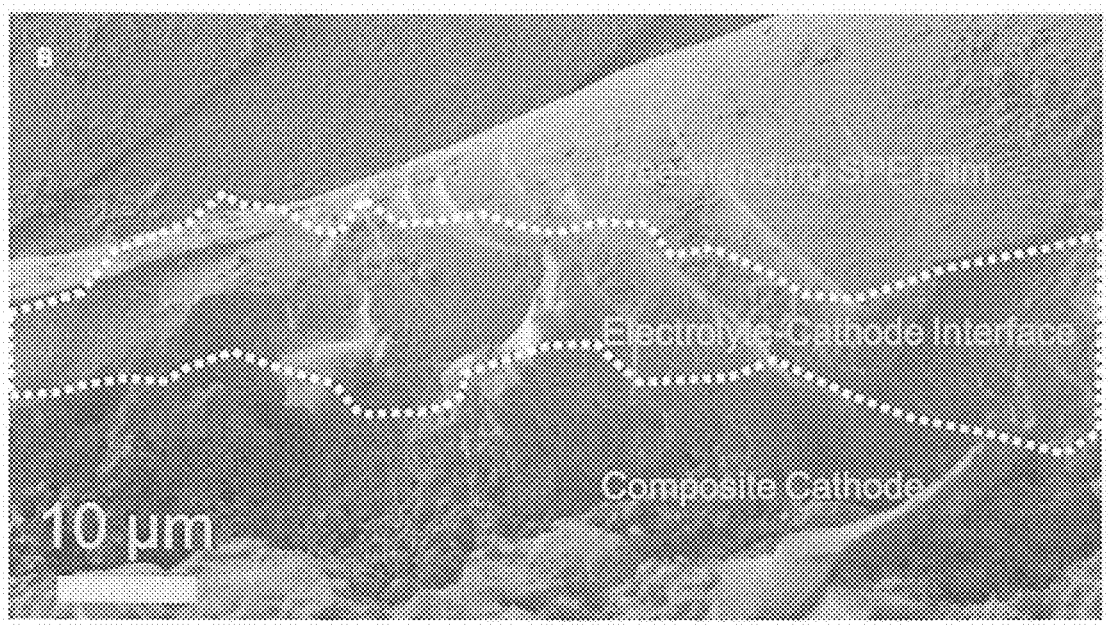
FIG. 2 is a scanning electron microscopy image of a cross section of a composite cathode laminated with a solid polymer electrolytic film.

FIG. 1 shows the steps involved when creating a composite cathode and the additional step involved to create a lithium ion battery that utilizes a solid polymer electrolytic film. Although FIG. 1 shows the utilization of a solid polymer electrolytic film in the creation of the lithium battery, one is not necessary. The electrode/electrolyte interface, as shown circled in FIG. 1, is shown by a scanning electron microscopy imaging in FIG. 2. As shown in FIG. 1, and as described in detail above, in a first step, a cathodic material is placed on top of a current collector, such as a piece of aluminum foil, then the cathodic material is infiltrated with an electrolytic solution and allowed to impregnate overnight. In the embodiments of the present invention that utilize a solid polymer electrolytic film, in a second step, the film is prepared by placing the materials that combine to make the electrolytic solution used to create the film in a mold. This solution is then heated to form the free-standing solid polymer electrolytic film. Once formed, the film can be combined with the composite cathode. Once combined, the film and composite cathode can be placed, along with a spring, a stainless steel spacer and an anode, within two coin cell cases so as to form the battery. The stainless steel spacer and the spring simply act as items that pack the cell tightly and the two coin cell cases simply act as caps to seal the cell closed. If the solid polymer electrolytic film is not being used in the battery, then just the composite cathode, along with the spring, a stainless steel spacer and an anode, are placed within two coin cell cases so as to form the battery.

Formation of Electrolytic Solution

The amount of each component utilized in the creation of the electrolytic solution, either for use in creating a composite cathode or a solid polymer electrolytic film is chosen such that the mixture is isotropic. The creation of suitable mixtures is based upon ternary phase diagrams generated for a given choice of crosslinkable polyether, plasticizer, and a first lithium salt.

To simplify the process, the initiator and the crosslinking agent (if present) and the second lithium salt, need not be taken into account in the creation of the ternary phase diagrams. This is not to say that they may have no effect on the creation of an amorphous mixture, but only that they are used in lesser amounts.

By eliminating the crystalline phase of the polymer and dissociation of lithium salt, the ionic conductivity of polymer composites could reach the maximum. However, the search for an optimized combination of different components in polymer electrolytes has often been based on the researchers' experience. In embodiments of the present invention, a ternary phase diagram approach is used to avoid Edisonian trial-and-error investigations in searching for ionic conductive polymer composites. Samples with different concentrations of PEGDA as the crosslinkable polyether, GCN as the plasticizer, and LiTFSI as the first lithium salt were prepared and used to study the crystalline and isotropic phase of the formed composite.

The formed composite is mounted on a glass slide and then placed under a polarized optical microscope to observe the morphology of the composite at different temperatures. The results show that three morphologies are observed in the composite at different temperatures: (1) the isotropic phase represents the amorphous state of the mixture. The isotropic phase is more desirable for high ionic conductivity. (2) Lithium salt crystal phase exists through the entire temperature range when the salt concentration is high, and it expands as the temperature decreases. (3) The PEGDA crystal phase is evident at low temperature. Although low-molecular weight PEGDA is amorphous at room temperature, it crystallizes at low temperature ($-10°$ C.) when the concentration of PEGDA in the composite is high. Spherulites formed which indicates the formation of a typical semi-crystalline polymer. The formation of polymer crystal will suppress the chain segment motion, leading to a low ionic conductivity.

The ternary phase diagram provides a design scheme for achieving high ionic conductivity in the electrolytic solutions formed. As batteries need to be operated at different temperatures, the overlap of the isotropic phase regions at different temperatures defined the composition range where the electrolytic solution should be prepared.

The low-molecular-weight PEGDA is liquid at room temperature. In order to form a free-standing solid polymer electrolytic film, PEGDA must be cured to form crosslinked solid polymer. In embodiments of the present invention, the free-standing solid polymer electrolytic film is fabricated by mixing a PEGDA prepolymer host, a first lithium salt, a plasticizer, and photoinitiator into a transparent liquid prior to the UV-induced photopolymerization. The ternary phase diagram of the crosslinked solid polymer electrolytic film was studied using similar methods and the results show that crosslinked PEGDA has a smaller polymer crystal region, which was expected since the crystallization process is suppressed in the crosslinked polymer network. It was also found that the free-standing solid polymer electrolytic films cannot be formed when the PEGDA ratio is low. A solid polymer electrolytic film formed with low PEGDA content is gel-like. Across three different temperatures the phase diagrams indicate the composition range where the free-standing solid polymer electrolytic film with an isotropic phase should be formed. Combining the ternary phase diagrams based on PEGDA/plasticizer/lithium salt and crosslinked solid polymer electrolytic film, the working area of how the electrolytic solutions should be formed is created.

In some embodiments of the present invention, when a solid polymer electrolytic film is being created, the crosslinkable polyether, plasticizer, first lithium salt, and second lithium salt, are thus mixed (together with any desired crosslinking agent) to form an amorphous mixture in the isotropic phase. The initiator may or may not be added at this stage. In some embodiments, it is added later. In some embodiments, the mixing takes place in an inert atmosphere, with low humidity, to avoid compromising the lithium salts. In some embodiments, the temperature of the mixture may be increased to facilitate the mixing of the components and in generating a homogeneous amorphous mixture in the isotropic phase. If generated by the addition of heat, the mixture should be observed as the temperature is reduced to ensure that the isotropic property remains. Any suitable equipment can be used to generate the amorphous mixture.

In some embodiments of the present invention, the initiator can be added after the creation of the amorphous mixture and mixed so as to facilitate the subsequent crosslinking of the crosslinkable polyether.

In some embodiments of the present invention, the amorphous mixture with initiator is thereafter cast or shaped so as to form a solid polymer electrolytic film. The amorphous mixture can then be made into any desired shape by casting it onto an appropriately shaped substrate. Release layers may be employed when a free-standing electrolyte film is desired. Notably, the amorphous mixture is readily capable of being cast or roll coated into any type of shape, thus making fabrication of more complex shapes a possibility.

In some embodiments of the present invention, the cast film can then be crosslinking by activating the initiator. This will crosslink the crosslinkable polyether (and any included crosslinking agent), and result in a finished solid polymer electrolytic film. In accordance with this invention, the crosslinked film is to remain isotropic. In some embodiments, the crosslinking takes place in an inert environment.

In light of the foregoing, it should be appreciated that the present invention significantly advances the art by providing a superionic conductive polymer electrolyte composite for the use in lithium batteries that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Creation of a composite cathode includes the preparation of an electrolytic solution of low-molecular-weight prepolymer PEGDA, a first lithium salt of LiTFSI, a second lithium salt of LiBOB, and GCN as the plasticizer. This electrolytic solution was infiltrated into an LFP based cathodic material. The infiltration took place overnight so that the solution could infiltrate the cathodic material thoroughly. Due to the low molecular weight of the non-crosslinked PEGDA, the electrolytic solution was a viscous liquid that could be integrated with active materials.

The infiltrated cathode was then combined with a solid polymer electrolytic film in a similar manner as to what is shown in FIG. 1 so as to create a lithium metal battery.

The galvanostatic charge/discharge cycles of the battery were determined. The first nine cycles were operated in the range of 2.5-3.7 V to ensure the formation of stable SEI layers on both the anode and the cathode. The initial discharge capacity showed a specific charge capacity of about 120 mAh/g at a current density of 0.2 C. The coulombic efficiency fluctuated in the first few cycles and eventually stabilized toward a value of greater than 99.5% in subsequent cycles, suggesting that a stable interfacial layer on both the anode and cathode were formed. After the initial nine cycles, the chemical window was further extended to 2.5-3.9 V to fully release the specific capacity within the battery at the same current density, where specific capacities of about 138 mAh/g could be achieved. This value was comparable with liquid electrolyte results using the same electrode materials. The battery exhibited an average coulombic efficiency of 99.99% through the following cycles. The specific capacity at its 200th cycle still exhibited a value of about 128 mAh/g, which was about 93% in capacity retention.

Comparisons were then made between batteries made with a single lithium salt electrolytic solution and those of the present invention that were prepared with a double lithium salt electrolytic solution. The battery made with a single lithium salt electrolytic solution had a capacity retention of 82% after 200 cycles. The specific capacity faded rapidly and started to severely fluctuate from about the 55th cycle, indicating the deterioration of the battery. The coulombic efficiency of the battery made with a single lithium salt electrolytic solution also fluctuated more compared to the battery of the present invention that was prepared with a double lithium salt electrolytic solution. The specific capacity of the battery of the present invention at its 370th cycle still exhibited a value of about 118 mAh/g, which was 86% in capacity retention. The overall better stability of the battery of the present invention could be ascribed to the synergistic effect of the LiBOB salt with the LiTFSI salt. The LiBOB salt passivated aluminum well at high potentials, serving as an ideal co-salt for the LiTFSI salt, whereas the LiTFSI salt mitigated the reaction of the LiBOB salt with the lithium metal anode, improving the stability of the battery.

What is claimed is:

1. A method of creating a composite cathode for use within a lithium ion battery comprising the steps of:
    a. preparing an electrolytic solution wherein the electrolytic solution includes a plasticizer, a crosslinkable polyether, a first lithium salt and a second lithium salt; and
    b. impregnating a cathodic material with the electrolytic solution so as to form the composite cathode.

2. The method of claim 1 wherein the cathodic material is selected from the group Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), and Lithium Manganese Oxide (LMO).

3. The method of claim 1 wherein the plasticizer is selected from the group consisting of glutaronitrile (GCN), succinonitrile (SCN), adiponitrile, camphor, dialkylsebacate, alkyl sterate, and mixtures thereof.

4. The method of claim 3 wherein the crosslinkable polyether is selected from the group consisting of poly (ethylene glycol)diacrylate (PEGDA), poly(ethylene glycol) dimethacrylate (PEGDMA), poly(propylene glycol) diacrylate (PPGDA), and poly(propylene glycol) dimethacrylate (PPGDMA), fluoroalkyl diacrylate, fluoroalkyl monoacrylate, fluoroalkyl dimetharylate, fluoroalkyl metharylate, and mixtures thereof.

5. The method of claim 4 wherein the first lithium salt is selected from the group consisting of lithium bis-trifluoromethanesulfonylimide (LiTFSI), lithium bis-perfluoroethylsulfonylimide, lithium tetrafluoroborate, and lithium perchlorate and mixtures thereof.

6. The method of claim 5 wherein the second lithium salt is selected from the group consisting of lithium bis(oxalate)

borate (LiBOB), lithium tetrafluoroborate (LiBF$_4$), lithium difluoro(oxalate)borate (LiODFB), lithium hexfluorophosphate LiPF$_6$), and mixtures thereof.

7. The method of claim 6 wherein the plasticizer is GCN, the crosslinkable polyether is PEGDA, the first lithium salt is LiTFSI, and the second lithium salt is LiBOB.

8. A method of creating a lithium ion battery comprising the steps of:
   a. preparing an anode;
   b. preparing a composite cathode comprising the steps of:
      i. preparing an electrolytic solution wherein the electrolytic solution includes a plasticizer, a crosslinkable polyether, a first lithium salt and a second lithium salt; and
      ii. impregnating a cathodic material with the electrolytic solution so as to form the composite cathode; and
   c. combining the anode and composite cathode to create the lithium ion battery.

9. The method of claim 8 wherein the anode is selected from the group consisting of lithium metal, graphite, silicon, tin, germanium, and combinations thereof.

10. The method of claim 8 wherein the cathodic material is selected from the group consisting of Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), and Lithium Manganese Oxide (LMO).

11. The method of claim 8 wherein the plasticizer is selected from the group consisting of glutaronitrile (GCN), succinonitrile (SCN), adiponitrile, camphor, dialkylsebacate, alkyl sterate, and mixtures thereof.

12. The method of claim 11 wherein the crosslinkable polyether is selected from the group consisting of poly(ethylene glycol)diacrylate (PEGDA), poly(ethylene glycol) dimethacrylate (PEGDMA), poly(propylene glycol) diacrylate (PPGDA), and poly(propylene glycol) dimethacrylate (PPGDMA), fluoralkyl diacrylate, fluoroalkyl monoacrylate, fluoroalkyl dimetharylate, fluoralkyl metharylate, and mixtures thereof.

13. The method of claim 12 wherein the first lithium salt is selected from the group consisting of lithium bis-trifluoromethanesulfonylimide (LiTFSI), lithium bis-perfluoroethylsulfonylimide, lithium tetrafluoroborate, and lithium perchlorate and mixtures thereof.

14. The method of claim 13 wherein the second lithium salt is selected from the group consisting of lithium bis(oxalate)borate (LiBOB), lithium tetrafluoroborate (LiBF$_4$), lithium difluoro(oxalate)borate (LiODFB), lithium hexfluorophosphate LiPF$_6$), and mixtures thereof.

15. The method of claim 14 wherein the plasticizer is GCN, the crosslinkable polyether is PEGDA, the first lithium salt is LiTFSI, and the second lithium salt is LiBOB.

16. The method of claim 8 further comprising the step of preparing a solid polymer electrolytic film prior to the combining step.

17. The method of claim 16 wherein the step of preparing a solid polymer electrolytic film comprises the sub-steps of:
   a. preparing an electrolytic film solution wherein the electrolytic film solution includes a plasticizer, a crosslinkable polyether, a first lithium salt, a second lithium salt, and a crosslinking agent; and
   b. crosslinking the electrolytic solution to form the solid polymer electrolytic film.

18. The method of claim 17 wherein the composite cathode is laminated with the solid polymer electrolytic film to form a laminated cathode.

19. The method of claim 17 wherein the plasticizer for the electrolytic film solution is selected from the group consisting of glutaronitrile (GCN), succinonitrile (SCN), adiponitrile, camphor, dialkylsebacate, alkyl sterate, and mixtures thereof and wherein the crosslinkable polyether for the electrolytic film solution is selected from the group consisting of poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA), fluoralkyl diacrylate, fluoroalkyl monoacrylate, fluoroalkyl dimetharylate, fluoralkyl metharylate, and mixtures thereof.

20. The method of claim 17 wherein the first lithium salt for the electrolytic film solution is selected from the group consisting of lithium bis-trifluoromethanesulfonylimide (LiTFSI), lithium bis-perfluoroethylsulfonylimide, lithium tetrafluoroborate, and lithium perchlorate and mixtures thereof; wherein the second lithium salt for the electrolytic film solution is selected from the group consisting of lithium bis(oxalate)borate (LiBOB), lithium tetrafluoroborate (LiBF$_4$), lithium difluoro(oxalate)borate (LiODFB), lithium hexfluorophosphate LiPF$_6$), and mixtures thereof; and wherein the crosslinking agent for the electrolytic film solution is selected from the group consisting of trimethylolpropane triacrylate (TMPTA), pentaerythritol triacrylate, trimethylolpropane ethoxylate triacrylate, trimethylolpropane propoxylate triacrylate, glycidyl methacrylate (GMA) and mixtures thereof.

* * * * *